United States Patent
Atmur et al.

(10) Patent No.: US 6,210,786 B1
(45) Date of Patent: *Apr. 3, 2001

(54) CERAMIC COMPOSITE MATERIALS HAVING TAILORED PHYSICAL PROPERTIES

(75) Inventors: Steven Donald Atmur, Riverside; Thomas Edward Strasser, Corona, both of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/172,361

(22) Filed: Oct. 14, 1998

(51) Int. Cl.⁷ .............................. B32B 18/00; B32B 17/12
(52) U.S. Cl. .................................... 428/293.4; 428/294.1; 428/297.4; 428/298.7; 428/299.1; 428/300.1
(58) Field of Search ............................ 428/293.4, 294.1, 428/297.4, 298.7, 299.1, 300.1

(56) References Cited

U.S. PATENT DOCUMENTS

| | | | |
|---|---|---|---|
| 5,043,118 * | 8/1991 | Kim et al. ............................ | 264/63 |
| 5,145,812 | 9/1992 | Arai et al. ............................ | 501/97 |
| 5,350,545 * | 9/1994 | Streckert et al. ................... | 264/29.1 |
| 5,359,911 | 11/1994 | Kruesi .................................. | 81/436 |
| 5,458,480 | 10/1995 | Newkirk et al. .................... | 425/547 |
| 5,459,114 * | 10/1995 | Kaya et al. .......................... | 501/96 |
| 5,494,867 | 2/1996 | Schwab et al. ...................... | 501/95 |
| 5,910,095 * | 6/1999 | Strasser et al. ..................... | 60/272 |
| 5,970,843 * | 10/1999 | Strasser et al. ..................... | 89/36.02 |

* cited by examiner

Primary Examiner—Blaine Copenheaver
Assistant Examiner—Ula C. Ruddock
(74) Attorney, Agent, or Firm—Terry J. Anderson; Karl J. Hoch, Jr.

(57) ABSTRACT

A fiber-reinforced ceramic matrix composite (FRCMC) structure exhibiting tailored characteristics such as ductility, hardness, and coefficient of friction. Generally, this tailoring involves incorporating fibers into the composite in sufficient quantities to produce a certain degree of ductility, and if desired, incorporating filler material into the composite in sufficient quantities to produce a desired degree of other characteristics such as hardness and coefficient of friction. In both cases, the degree to which these respective characteristics are exhibited varies with the percent by volume of fibers and filler materials incorporated into the structure. Additionally, the degree to which these respective characteristics are exhibited varies with the form of fibers used (i.e., continuous or non-continuous) and with type of filler material employed. Thus, the tailoring of the characteristics exhibited by a FRCMC structure specifically involves selecting the quantity and form of the fibers that will produce the desired ductility, and selecting the amount and types of filler material that will produce the desired hardness and/or coefficient of friction in the FRCMC material.

31 Claims, 4 Drawing Sheets

| SAMPLE NO. | FILLER VOLUME | FIBER LENGTH AND VOLUME | BULK HARDNESS RANGE (KNOOP) | FAILURE STRAIN |
|---|---|---|---|---|
| 1 | 60%SiC | 20% 0.25" FIBER | 1905−2705 | 0.11 |
| 2 | 50%SiC | 25% " | 2045−2570 | 0.12 |
| 3 | 40%SiC | 30% " | 1715−2440 | 0.13 |
| 4 | 60%Al$_2$O$_3$ | 20% " | — | 0.11 |
| 5 | 50%Al$_2$O$_3$ | 25% " | 1340−1640 | 0.12 |
| 6 | 40%Al$_2$O$_3$ | 30% " | 1400−1790 | 0.13 |
| 7 | 60%Si$_3$N$_4$ | 20% " | 1060−1565 | 0.11 |
| 8 | 50%Si$_3$N$_4$ | 25% " | 1165−1880 | 0.12 |
| 9 | 40%Si$_3$N$_4$ | 30% " | 780−1210 | 0.13 |
| 10 | 60%B$_4$C | 20% " | 1800−2930 | 0.11 |
| 11 | 50%B$_4$C | 25% " | 2360−2825 | 0.12 |
| 12 | 40%B$_4$C | 30% " | 1670−1990 | 0.13 |
| 13 | 50%SiC | 25% 1.2" FIBERS | 2220−2805 | 0.12 |
| 14 | 60%Si$_3$N$_4$ | 20% " | 985−1355 | 0.11 |
| 15 | 60%B$_4$C | 20% " | 2755−3130 | 0.11 |
| 16 | 40%B$_4$C | 30% " | — | 0.13 |

FIG. 3

CERAMIC COMPOSITE MATERIALS HAVING TAILORED PHYSICAL PROPERTIES

FIELD OF THE INVENTION

This invention relates to structural and mechanical parts formed from fiber-reinforced ceramic matrix composite (FRCMC) materials, and more particularly, to such parts having specific types of fibers and filler materials incorporated therein so as to tailor the ductility, hardness and coefficient of friction exhibited by the parts.

BACKGROUND OF THE INVENTION

Fiber reinforced ceramic matrix composite (FRCMC) materials have recently been employed to make structural components for aircraft. Specifically, these components have been used as so called "hot structures", i.e. portions of the aircraft which must withstand high temperatures. FRCMC parts have fibers of various types and lengths disposed throughout a ceramic matrix formed from a pre-ceramic resin. Such parts have advantages over those formed of organic composite materials. For example, organic composites would tend to degrade in high temperature environments such as described above. While organic composites will burn readily, FRCMC, being a ceramic, withstands heat that can destroy even metals. A FRCMC material can withstand continuous temperatures up to about 1000° F., cyclical temperatures up to about 2000° F., and short-term exposure to temperatures up to about 3500° F. FRCMC structures also have advantages over those made from monolithic ceramic materials. Although monolithic ceramic structures can withstand high temperatures, they tend to be porous, delicate, and brittle. These parts are easily broken or cracked when impacted, or otherwise subjected to even moderate forces. Parts made from FRCMC materials, on the other hand, exhibit an increased ductility. Ductility for the purposes of the present invention is defined as the amount of strain a sample of the FRCMC material can withstand before fracturing. Increasing the ductility of a part makes it less susceptible to the fracturing associated with monolithic ceramic parts.

FRCMC materials have in the past been generally restricted to structural components designed to withstand high temperature environments. Other than its inherent heat resistance, no other significant demand is made on the parts employed in these types of applications. However, FRCMC materials could be useful in many other applications where certain additional physical characteristics would be required. For example, FRCMC materials could be employed in mechanical parts which are intended to be in sliding contact with other parts. In such a case it would be desirable that the FRCMC material exhibit high ductility and erosion resistance, and a low coefficient of friction. In other applications, such as in the friction components of brakes and clutches, the same erosion resistance would be desired, but the FRCMC material would have to exhibit a high coefficient of friction to prevent slipping. In the case of structural components, a FRCMC part may not only be required to withstand high temperatures, but also abrasive environments. This calls for a FRCMC material which is hard enough to survive in these abrasive environments.

Accordingly, there is a need for parts made of FRCMC materials that exhibit a desired ductility, hardness (i.e., erosion resistance) and/or coefficient of friction required for a particular application.

It is therefore an object of the present invention to provide FRCMC parts which exhibit a desired degree of ductility.

It is another object of the present invention to provide FRCMC parts which exhibit a desired degree of hardness, or a desired coefficient of friction, or both.

These and other objects of the present invention will become apparent throughout the description thereof which now follows.

SUMMARY OF THE INVENTION

The above-described objects of the invention are realized by the tailoring of physical properties or characteristics exhibited by a fiber-reinforced ceramic matrix composite (FRCMC) structure. In general, FRCMC material includes a polymer-derived ceramic resin in its ceramic state, fibers, and possibly filler materials. The pre-ceramic resin used to form the FRCMC material can be any commercially available polymer-derived ceramic precursor resin, such as AlliedSignal's BLACKGLAS™, Dupont Lanxide's Ceraset™, Dow Chemical's SYLRAMIC™ or Applied Polymerics' CO-2 resin, and the fibers are preferably at least one of alumina, Nextel 312, Nextel 440, Nextel 510, Nextel 550, silicon nitride, silicon carbide, HPZ, graphite, carbon, and peat. The fibers are also preferably coated with an interface material taking the form of at least one 0.1–0.5 micron thick layer of at least one of carbon, silicon nitride, silicon carbide, silicon carboxide, or boron nitride. Filler materials can be incorporated into the composite to produce certain characteristics desired to be exhibited by the FRCMC material.

The aforementioned tailoring of characteristics exhibited by a FRCMC structure includes incorporating fibers into the composite to produce the desired degree of ductility necessary to ensure the survival of the FRCMC structure. Additionally, the hardness and the coefficient of friction exhibited can be tailored by incorporating filler material into the composite to produce the desired degree of these characteristics. In both cases, the degree to which these respective characteristics are exhibited varies with the percent by volume of fibers and filler materials incorporated into the structure. Additionally, the degree to which these respective characteristics are exhibited varies with the form of fibers used and with the type of filler material employed. Therefore, the tailoring of the characteristics exhibited by a FRCMC structure specifically involves selecting the quantity and form of the fibers that will produce the desired ductility, and selecting the amount and types of filler material that will produce the desired hardness and/or coefficient of friction in the FRCMC material.

The fibers in general will preferably make up about 15 to 55 percent of the volume of the FRCMC structure depending on the degree of ductility desired. In regards to the form of the fibers, a selection can be made between a continuous or a non-continuous fiber configuration. A continuous fiber configuration corresponds to woven fiber systems where the individual fibers typically run the entire length of the FRCMC structure, whereas non-continuous fiber configurations are associated with loose or chopped fibers which often terminate within the structure itself. Fibers in a continuous fiber configuration can produce a higher degree of ductility than will a non-continuous fiber configuration.

The filler materials, if used, preferably take the form of powders having particle sizes within a range of about 1 to 60 microns, and will make up from about 10 percent to about 60 percent of the volume of the FRCMC structure. Filler materials such as alumina, mullite, titania, and silicon carbide will increase both the hardness and the coefficient of friction compared to a structure lacking these materials.

Filler materials such as graphite, silicon nitride and iron, and silica will decrease both the hardness and coefficient of friction exhibited by the FRCMC structure. Finally, filler materials such as silicon nitride, boron nitride, and boron carbide will increase the hardness while decreasing the coefficient of friction exhibited by the structure.

An example of a FRCMC structure with tailored characteristics is one having enhanced hardness and erosion resistance characteristics, such as might be employed in an abrasive environment. Such a structure is made up of a polymer-derived ceramic resin as earlier exemplified in its ceramic form, fibers in sufficient quantities to produce a desired degree of ductility in the structure, and filler material in sufficient quantities to produce the desired degree of hardness in the structure. Preferably, the fibers are also coated with one of the aforementioned interface materials to increase the ductility of the structure even further.

The fibers incorporated in the erosion resistant FRCMC structure may be either in a continuous or non-continuous configuration and preferably will make up about 15 to 40 percent of the volume of the structure. The fibers employed can be any of those listed previously, although ceramic type fibers are preferred. The filler material incorporated into the structure may be any of those listed above which were indicated as increasing the hardness of the material. In this example, the coefficient of friction is not of concern so it is not addressed. The percentage by volume of the structure consisting of the filler material is preferably within a range of about 25 to 60 percent. One particularly erosion resistant FRCMC structure is made up of Nextel 312 type fibers constituting about 25 percent of the volume of the structure and alumina filler material constituting about 50 percent of the volume of the structure. The remaining 25 percent of the volume of the structure consists of a silicon-carboxyl resin sold by Allied Signal under the trademark BLACKGLAS™ converted to its ceramic state. This structure was tested and found to exhibit a Knoop hardness of about 2200.

In addition to the just described benefits, other objectives and advantages of the present invention will become apparent from the detailed description which follows hereinafter when taken in conjunction with the drawing figures which accompany it.

BRIEF DESCRIPTION OF THE DRAWINGS

The specific features, aspects, and advantages of the present invention will become better understood with regard to the following description, appended claims, and accompanying drawings where:

FIG. 3 is a table providing examples of filler materials constituting various percentages of a FRCMC structure and the resulting bulk hardness exhibited by the material. In addition, the percentage of fiber employed in the structure is also given, as well as the resulting failure strain exhibited;

DETAILED DESCRIPTION OF THE PREFERRED EMBODIMENTS

Figure 1:
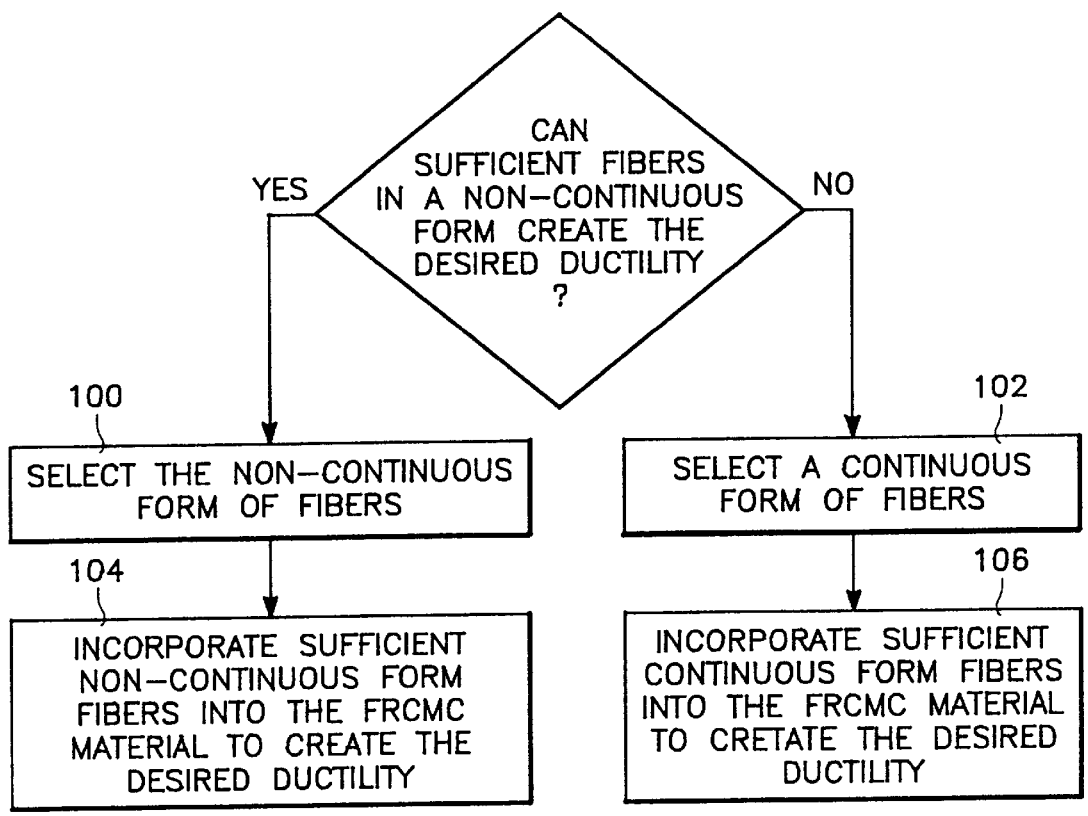
FIG. 1 is a block diagram of a method for tailoring the ductility of a FRCMC structure in accordance with the present invention.

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

In accordance with a preferred embodiment of the present invention, the ductility, hardness, and coefficient of friction exhibited by an FRCMC part is tailored to match the requirements of a specific application. FRCMC structures are generally made by combining any commercially available polymer-derived ceramic precursor resin, such as silicon-carboxyl resin or alumina silicate resin, with some type of fibers. Examples of appropriate ceramic precursor resins include BLACKGLAS™ sold by Allied Signal, CERASET™ sold by the Dupont Lanxide Corporation, SYLRAMIC™ sold by Dow Chemical, STARFIRE™ sold by the Starfire Corporation, and TOREN™ sold by the Toren Corporation. An example of an appropriate alumina silicate pre-ceramic resin is CO-2 sold by Applied Polymerics. Examples of types of fibers which might be employed in an FRCMC material include alumina, Nextel 312, Nextel 440, Nextel 510, Nextel 550, silicon nitride, silicon carbide, HPZ, graphite, carbon, and peat. To further enhance the ductility of the material, the fibers being incorporated into the FRCMC material are preferably first coated with an interface material such as carbon, silicon nitride, silicon carbide, silicon carboxide, boron nitride, or multiple layers of one or more of these interfacial materials. The interface material prevents the resin from adhering directly to the fibers. Thus, after the resin has been converted to a ceramic, there is a weak interface between the ceramic matrix and the fibers. This weak bond enhances the ductility exhibited by the FRCMC material because the fibers are less likely to break, even when the surrounding ceramic material has fractured in response to an applied strain. The unbroken fibers tend to hold the FRCMC structure together enhancing its survivability. In addition, the FRCMC material can include filler materials preferably in the form of powders having particle sizes somewhere between about 1 and 60 microns. The resin, fiber, and possibly filler material mixture is generally formed into the shape of the desired structure via one of a variety of methods and heated for a time to a temperature, as specified by the material suppliers (typically between 1,500° F. and 2,000° F.), which causes the resin to be converted into a ceramic.

The fibers and interface materials incorporated into the FRCMC material provide ductility to the FRCMC structure. This ductility gives the FRCMC structure the strength to withstand the rigors of handling and thermally-induced strains associated with may applications in which these materials can be used to advantage. While the FRCMC material will exhibit increased ductility over a monolithic ceramic due to mere existence of fibers and the aforementioned interface coating, the particular degree of ductility exhibited is primarily controlled by manipulating the amount of the fibers employed in the composite material making up the part, and/or by choosing between a woven fiber structure and discontinuous fibers.

Generally, the greater the percentage of fibers in the composite material, the greater its ductility. For example, it has been found that a FRCMC material consisting of the fibers is within a range of about 15 to 55 percent by volume will produce a degree of ductility between about 0.11 percent and 0.60 percent strain to failure. The lower the fiber volume is within the range, the lower the resulting ductility. Further, woven fiber configurations exhibit a greater ductility than loose or discontinuous fiber configurations. A woven fiber structure is referred to as continuous because the fibers typically run the entire length of the part, whereas loose fibers are referred to as discontinuous as they typically terminate within the structure itself.

Given the above considerations, a preferred process for tailoring the ductility exhibited by a FRCMC structure will now be discussed. Referring to FIG. 1, the process generally involves incorporating interface material-coated fibers into the FRCMC material in sufficient quantities to produce a desired degree of ductility in the structure created from the material (step 104 or 106). However, first the form of the fibers must be selected. Specifically, if sufficient quantities of the fibers can be incorporated into the FRCMC material to produce the desired ductility, it is preferred that the previously-described discontinuous form of the fibers be chosen (step 100), as this form is less costly than the woven, continuous configuration. Further, in some applications, the form of the fibers may be restricted to discontinuous types. For example, injection molding processes typically require the use of discontinuous fibers. In these situations, the ductility of the FRCMC material must be achieved using a discontinuous form of the fibers. However, if a sufficient quantity of fibers cannot be incorporated into the FRCMC material to produce the desired ductility using the discontinuous form of the fibers and the application is not limited to this form, then the woven, continuous fiber configuration can be employed (step 102). For example, in an application where the amount of fibers used in the composite must be limited, a continuous fiber configuration could be employed to obtain the desired ductility. This situation can occur where the percentage of filler materials needed to produce a particular characteristic must be so high that there is little room left for the fibers.

The hardness and coefficient of friction exhibited by a FRCMC part is controlled by the addition of certain types of filler materials in the FRCMC material. This is preferably accomplished by incorporating these filler materials into the resin-fiber mixture prior to forming the part, although the filler material could be infiltrated into an already formed part via known processes such as the "SOL-GEL" technique. It is envisioned that between about 10 to 60 percent by volume of the FRCMC material could be made up of filler materials to impart the specific hardness and/or coefficient of friction desired of the part.

Figure 2:
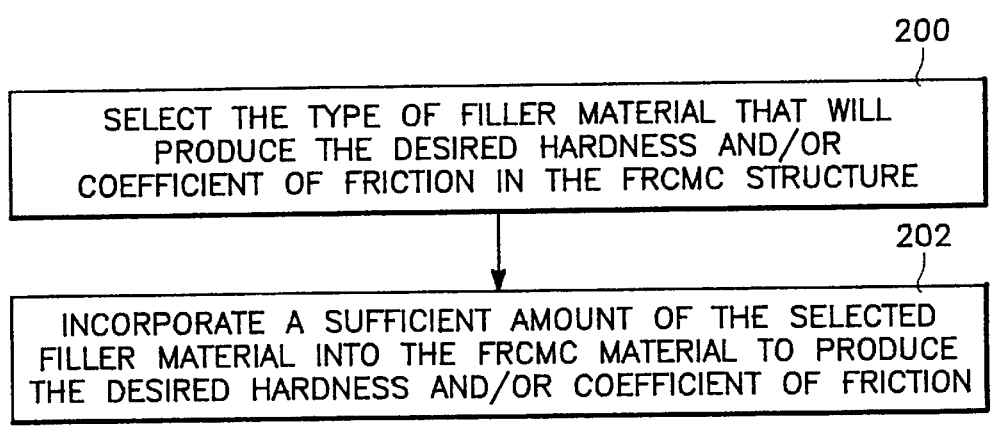
FIG. 2 is a block diagram of a method for tailoring the hardness and/or coefficient of friction of a FRCMC structure in accordance with the present invention.

Generally, both the type of filler material and the amount employed will determine the characteristics exhibited by the finished part. FIG. 2 illustrates a preferred process for tailoring the hardness and coefficient of friction characteristics of a FRCMC material in view of these two factors. The process involves first selecting the type of filler material that will produce the degree of hardness and/or the coefficient of friction desired to be exhibited by the FRCMC structure (step 200). For example, if it is desired that the part exhibit an increased degree of hardness and/or an increased coefficient of friction, the filler material could include one or more of the following materials: alumina, mullite, silica, and titania. Similarly, if the part need not be hard, but must exhibit a decreased coefficient of friction, then the filler could be graphite and/or silicon nitrate. Other materials such as silicon carbide, silicon nitride, and boron nitride will produce an increased degree of hardness, but also a decreased coefficient of friction. It is to be understood, of course, that the recitation of materials here are meant to be non-limiting examples.

Once the type of filler material is selected, the next step 202 in the process is to incorporate the filler material(s) in the FRCMC material in sufficient quantities to produce the desired degree of hardness and/or the desired coefficient of friction. It is believed the various materials identified above (as well as related materials), when used alone or in combination, can produce hardnesses ranging from about 500 to 3000 Knoop, and coefficients of friction ranging from about 0.3 to 1.0. For example, the table provided in FIG. 3 lists a few examples of filler materials constituting various percentages of a FRCMC material and the resulting bulk hardness range exhibited by the material. In addition, the percentage of fiber employed is also given, as well as the resulting failure strain exhibited by the FRCMC material. It is noted that the table of FIG. 3 is meant as an example only and is not intended to limit the scope of the present invention to the listed materials or percentages. The particular percentages of filler material or combination of materials that will produce the desired characteristic or characteristics in a FRCMC structure can be readily determined using known evaluative techniques with a minimum of effort. Such techniques were employed to obtain the data provided in FIG. 3 and include standard Knoop hardness and 3 point flexure testing. As the characteristics produced by filler materials are readily ascertainable using the aforementioned evaluative techniques, exhaustive lists of all possible material percentages and combinations are not provided herein.

The previously-described processes for tailoring the ductility, hardness, and/or coefficient of friction exhibited by a part made from FRCMC materials will now be exemplified in association with the production of a highly abrasion resistant structure. Abrasion resistant structures are useful in a variety of applications. For example, in the glass recycling industry, a glass separator is employed which separates pulverized glass (referred to as glass frit) from other materials, such as ceramic grit residue, which contaminates the glass frit. An optical monitoring system is employed in the glass separator to determine when the glass grit is sufficiently pure. Typically, the lens employed in the optical system is protected by a plate. This protective plate susceptible to wear due to the impact of the abrasive particles of glass, ceramic, etc., as they move through the separator. The use of a highly erosion resistant protective plate made of FRCMC material would prevent the need to replace the plate as often, and increase the accuracy of the optical monitoring process.

Another example of an application requiring an erosion resistant structure is in the processing of substrates used to produce electronic circuits. Part of the cleaning process associated with these substrates entails air blasting. The substrates are typically supported on a granite table during this air blasting process. Although granite is reasonable erosion resistant, the tables still tend to wear away quickly. A table constructed of a highly erosion resistant FRCMC material which greatly exceeds the erosion resisting capability of the conventional granite tables would preclude the need to replace the table as often. Other examples of application requiring highly erosion resistant structures include spacecraft, satellites, missiles, leading edges on aircraft structures, and sandblast shields, to name a few. Of course, structures made of materials other than FRCMC could be employed for these applications. For instance, some monolithic ceramic structures would provide extremely high erosion resistant qualities. However, monolithic ceramic structures are extremely brittle and susceptible to fracturing as discussed previously. In addition, structures with complex shapes, as may be required in the aforementioned applications, are difficult or impossible to produce from monolithic ceramic materials. FRCMC materials, on the other hand, are readily formable into complex shapes and exhibit ductility not possible with monolithic ceramics. For example, erosion resistant FRCMC materials can be formed into flat or arcuate panels, ducts and tubes.

Erosion resistant structures of the type described above typically require a reasonable degree of ductility to ensure structural integrity, but not an extreme amount. It is believed a ductility of approximately 0.1 to 0.2 would be adequate for many applications. A loose fiber configuration made up of one or more of the previously listed fiber types can impart this range of ductility to the FRCMC material when 15–40 percent by volume of the material comprise these fibers.

An erosion resistant FRCMC structure accordingly to the present invention preferably exhibits a hardness exceeding about 1,500 on the Knoop scale. Filler materials comprising one or more of alumina, mullite, silica, silicon carbide, titania, silicon nitride, and boron nitride, in amounts constituting about 25–60 percent by volume will impart the desired hardness to the FRCMC material making up the abrasion resistant structure. It is noted that the percent by volume of pre-ceramic resin employed in the composite must be at least approximately 15 percent and no more than about 40 percent. As erosion resistant structures such as those described above are not typically in sliding contact with other parts, the coefficient of friction is not a significant concern. Accordingly, this characteristic of the FRCMC material need not be considered in the present exemplary analysis. However, if the coefficient of friction were a factor, an appropriate type and amount of filler material which would provide both the desired hardness and coefficient of friction could be selected.

In a tested embodiment of an erosion resistant FRCMC structure according to the present invention, it was desired to produce a high degree of hardness (i.e., at least about 2,200 on the Knoop scale). The coefficient of friction of the material was not considered in the tested embodiment. A Knoop hardness of about 2,200 can be achieved using alumina filler material in an amount constituting about 50 percent by volume of the composite. For the tested embodiment, Nextel 312 fibers having a loose, discontinuous configuration were chosen to be incorporated into the composite. Loose, discontinuous fibers were chosen for the tested embodiment as they were sufficient to provide the desired ductility without having to resort to a more expensive woven fiber (i.e., continuous) configuration. Specifically, the fibers will provide a ductility of about 0.12 strain to failure when about 25 percent by volume of the composite constitutes these fibers. Given the above filler material and fiber percentages, it can be seen that about 25 percent by volume of the composite making up the erosion resistant structure will be made up of pre-ceramic resin converted to its ceramic state. In the tested embodiment BLACKGLAS™ resin was used. The tested embodiment was formed using a compression molding method as described in co-pending application Ser. No. 08/704,348 filed on Aug. 28, 1996. The disclosure of this co-pending application is herein incorporated by reference.

Figure 4:
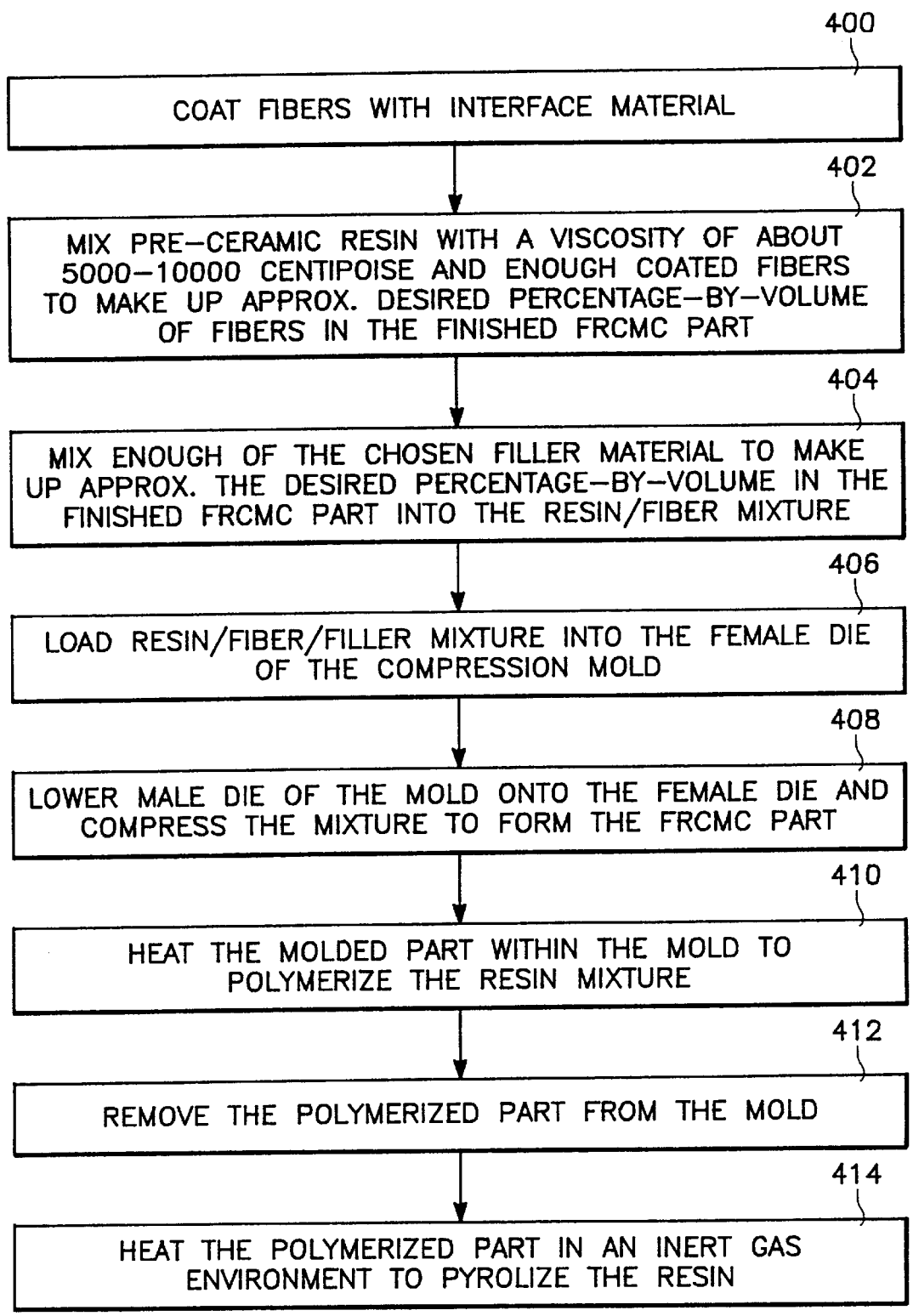
FIG. 4 is a block diagram of a compression molding method for forming a FRCMC part.

Referring to FIG. 4, a simplified process is provided as an example of using the aforementioned compression molding procedure to form an erosion resistant FRCMC structure according to the present invention.

1. The first step 400 is to coat the fibers chosen for the erosion resistant structure with an interface material, such as the aforementioned carbon, silicon nitride, silicon carbide and/or boron nitride, in one 0.1–0.5 micron thick layer or multiple layers of one or more of these interfacial materials. In this case Nextel 312 fibers having lengths of about 0.25 inch were chosen and coated with one layer of boron nitride.

2. Next, a quantity of the coated fibers, which once distributed and packed into a compression mold will produce the desired percent by volume of fiber in the resulting FRCMC structure, is mixed into a pre-ceramic resin preferably having a viscosity of about 5,000 to 10,000 centipoise so as to ensure movement of the coated fibers with the resin within the compression mold (step 402). In this example, BLACKGLAS™ resin was employed. Enough resin is used, to cause the fibers and filler material to flow with the resin and pack into every part of the compression mold's cavity. Excess resin will flow through the packed fibers and filler material and out of the resin outlet ports of the compression mold, as described in the aforementioned co-pending application.

3. Enough of the chosen filler material, which when distributed and packed into the compression mold will produce the desired percent by volume of filler material in the resulting FRCMC structure, is then added to the resin-fiber mixture (step 404). Preferably, the particles of the filler material are dispersed uniformly throughout the mixture. In this case, the filler material used was alumina in an amount that ultimately constituted about 50 percent by volume of the resulting FRCMC structure.

4. Next, the mixture is loaded into a cavity of a female die of the compression mold (step 406). The cavity has a shape, which in combination with a male die, forms the desired erosion resistant FRCMC structure.

5. The male mold die is then lowered and the mold compressed to form the part (step 408). As the bulk molding compound is compressed, the fibers and filler material in the compound will pack into place in the mold cavity with resin filling the spaces between the fibers and filler materials. Excess resin is ejected from the mold through the resin outlet ports.

6. The molded part is then heated (step 410) within the mold per the following cycle (as recommended by the manufacturer of the BLACKGLAS™ resin):

A) Ramp from ambient to 150° F. at 2.7°/minute

B) Hold at 150° F. for 30 minutes

C) Ramp at 1.7°/minute to 300° F.

D) Hold at 300° F. for 60 minutes

E) Cool at 1.2°/minute until temperature is below 140° F.

It should be noted that there are a variety of heat-up cycles which will create useable hardware and the foregoing is by way of one example only and not intended to be exclusive. This heating cycle polymerizes the resin. The erosion resistant structure is then in a "green state" similar to bisque-ware in ceramics, such that it does not have its full strength as yet, but can be handled.

7. The now polymerized composite structure is then removed from the compression mold (step 412) and heated in a controlled environment, such as in an inert gas environment (step 414). This heating pyrolyzes the resin, thereby turning it into a ceramic. The structure is fired based on the following schedule (as recommended by the manufacturer of the BLACKGLAS™ resin):

A) Ramp to 300° F. at 223°/hour

B) Ramp to 900° F. at 43°/hour

C) Ramp to 1400 F. at 20°/hour

D) Ramp to 1600° F. at 50°/hour

E) Hold at 1600° F. for 4 hours

F) Ramp to 77° F. at −125°/hour

Again, there are a variety of heating schedules other than this example that could be used to yield usable hardware.

Upon cooling, the erosion resistant structure is removed from the furnace.

Figure 5:
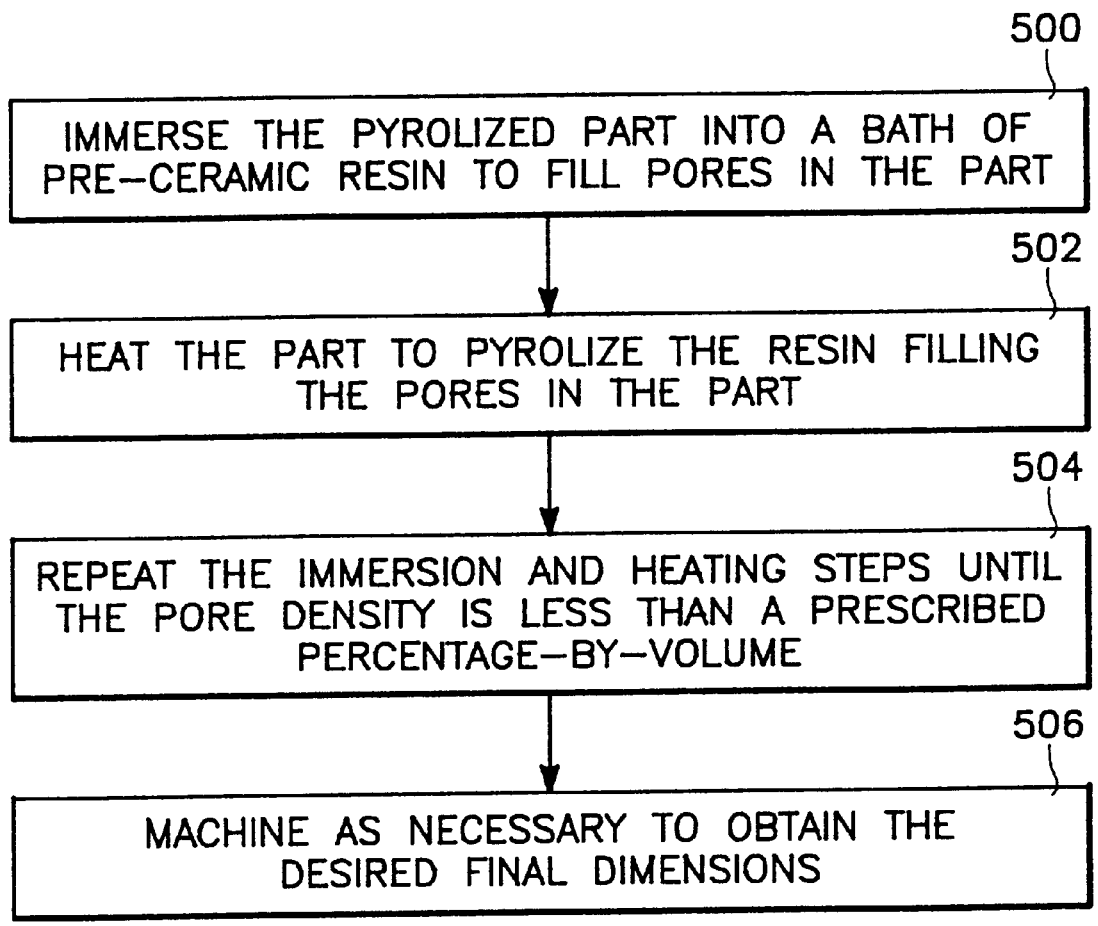
FIG. 5 is a block diagram of a method for eliminating pores created during the required heating cycles associated with the molding method of FIG. 4.

Once the FRCMC part has been molded via the foregoing compression molding process, it is preferred that an additional procedure be performed to eliminate pores created during the conversion to ceramic. Eliminating these pores strengthens the part. Specifically, referring to FIG. 5, after the completion of the heating step which pyrolizes the FRCMC part, it is immersed into a bath of a pre-ceramic resin to fill the pores (step 500). The part is then heated at a temperature and for a time associated with the resin filling the pores so as to transform it into a ceramic material (step 502). Unfortunately, the process of heating the resin filling the pores will create further pores. Accordingly, it is desired that the filling and heating steps be repeated until the pore density within the FRCMC part is less than a prescribed percentage by volume (step 504). This prescribed percentage corresponds to the point where the part will exhibit a repeatable strength from one part to the next. It is believed five iterations of the filling and firing process are typically required to obtain this repeatable part strength. To facilitate the filling step, it is preferred that the resin has a water-like viscosity. In addition, the FRCMC part could be placed in a vacuum environment to assist in the filling of the pores. Once the void filling process is complete, any machining necessary to obtain the desired final dimension of the part can be performed via conventional methods used for monolithic ceramics (step 506).

Of course, erosion resistant structures made according to the present invention can also be initially formed using other methods applicable to polymer composite part formation such as injection molding, resin transfer molding, hot pressing, tape or tow placement, or hand lay-up. However, it is not intended to limit the invention to any of the described methods. Rather any appropriate method may be employed to form the structures from the previously-described FRCMC material.

While the invention has been described in detail by reference to the preferred embodiment described above, it is understood that variations and modifications thereof may be made without departing from the true spirit and scope of the invention. For example, the simplified compression molding process described in connection with the forming of erosion resistant FRCMC structures would produce a homogeneous composite where the percentages of the resin, fibers, and filler material are substantially consistent throughout the molded structure. However, this need not be the case. Some applications may call for a heterogeneous structure where the types and percentages of the components making up the composite vary from section to section in order to impart a varying set of characteristics. For example, it is possible that only a portion of the overall FRCMC component is desired to exhibit an increased hardness and erosion resistance. In this case, just those areas of the structure which are to be erosion resistant would contain the filler materials for increasing the hardness of the FRCMC material. Methods for producing such heterogeneous structures are disclosed in the above-referenced co-pending application.

Further, while only the tailoring of the hardness and coefficient of friction characteristics exhibited by a FRCMC structure were described heretofore, the same tailoring methods can be used to produce other characteristics in the part. In general, a FRCMC structure can be tailored to exhibit a desired degree of any characteristic producible by the addition of a particular filler material or materials via the previously-described processes embodying the present invention.

What is claimed is:

1. A fiber-reinforced ceramic matrix composite (FRCMC) structure having tailored physical properties, comprising:
    a polymer-derived ceramic resin in its ceramic form; and
    fibers in a sufficient quantity incorporated within the ceramic resin to produce a desired degree of ductility exhibited by the structure, wherein the degree of ductility exhibited varies with the percentage by volume of the fibers, with said fibers having thereon an interface coating different from the composite and residing on the fibers between the fibers and the composite.

2. The FRCMC structure of claim 1, wherein said interface coating comprises at least one 0.1–0.5 micron thick layer of at least one of carbon, silicon nitride, silicon carbide, and boron nitride.

3. The FRCMC structure of claim 1, wherein the percentage by volume of the fibers is from about 15 to 55 percent.

4. The FRCMC structure of claim 1 wherein the polymer-derived ceramic resin is chosen from silicon-carboxyl resin and alumina silicate resin.

5. The FRCMC structure of claim 1, wherein the form of the fibers incorporated into the resin have either a continuous configuration or a non-continuous configuration, said fiber form also affecting the degree of ductility exhibited, and wherein the fiber form employed is capable of producing the desired degree of ductility.

6. The FRCMC structure of claim 5, wherein the fibers comprise at least one of alumina, silicon nitride, silicon carbide, graphite, carbon and peat.

7. The FRCMC structure of claim 1, further comprising filler material in a sufficient quantity to produce a desired degree of at least one property exhibited by the structure, wherein the degree to which said at least one property is exhibited varies with the percentage by volume of the filler material.

8. The FRCMC structure of claim 7, wherein the percentage by volume of the filler material is from about 10 to 60 percent.

9. The FRCMC structure of claim 7 wherein the filler material comprises particles sized from about 1 to 50 microns.

10. The FRCMC structure of claim 7, wherein the filler material additionally affects the degree to which the at least one property is exhibited, and wherein the filler material employed is capable of producing the desired degree of the at least one property.

11. The FRCMC structure of claim 10, wherein the at least one property comprises the hardness or the coefficient of friction exhibited by the FRCMC structure.

12. The FRCMC structure of claim 11, wherein the filler material causes an increase in both the hardness and coefficient of friction exhibited by the FRCMC structure.

13. The FRCMC structure of claim 12, wherein the filler material is at least one of alumina, mullite, silica, and titania.

14. The FRCMC structure of claim 11, wherein the filler material causes a decrease in both the hardness and coefficient of friction exhibited by the FRCMC structure.

15. The FRCMC structure of claim 14, wherein the filler material is at least one of graphite and silicon nitrate.

16. The FRCMC structure of claim 11, wherein the filler material causes an increase in the hardness and a decrease in the coefficient of friction exhibited by the FRCMC structure.

17. The FRCMC structure of claim 16, wherein the filler material is at least one of silicon carbide, silicon nitride, and boron nitride.

18. A fiber-reinforced ceramic matrix composite (FRCMC) structure exhibiting enhanced hardness and erosion physical properties, comprising:

a polymer-derived ceramic resin in its ceramic form; and fibers in a sufficient quantity incorporated within the ceramic resin to produce a desired degree of ductility in the structure, said fibers having thereon an interface coating different from the composite and residing on the fibers between the fibers and the composite;

filler material in a sufficient quantity incorporated within the ceramic resin to produce a desired degree of hardness in the structure.

19. The FRCMC structure of claim 18, wherein said interface coating comprises at least one 0.1–0.5 micron thick layer of at least one of carbon, silicon nitride, silicon carbide, and boron nitride.

20. The FRCMC structure of claim 18 wherein the polymer-derived ceramic resin is chosen from silicon-carboxyl resin and alumina silicate resin.

21. The FRCMC structure of claim 18, wherein the form of the fibers incorporated into the structure have either a continuous configuration or a non-continuous configuration.

22. The FRCMC structure of claim 18 wherein:

the percentage by volume of the fibers is from about 15 to 40 percent;

the percentage by volume of the filler material is from about 25 to 60 percent; and the percentage by volume of the polymer-derived ceramic resin in its ceramic form is from about 15 to 40 percent.

23. The FRCMC structure of claim 22, wherein the fibers comprise ceramic fibers.

24. The FRCMC structure of claim 22, wherein the fibers comprise at least one of alumina, silicon nitride, silicon carbide, graphite, carbon and peat.

25. The FRCMC structure of claim 22, wherein the filler material comprises at least one of alumina, mullite, silica, silicon carbide, titania, silicon nitride, and boron nitride.

26. A method for tailoring physical properties exhibited by a fiber-reinforced ceramic matrix composite (FRCMC) structure formed by a fiber-reinforced ceramic matrix composite, comprising the step of:

incorporating fibers having an interface coating thereon into the composite in a sufficient quantity to produce a desired degree of ductility exhibited by the structure, wherein the degree of ductility exhibited varies with the percentage by volume of the composite consisting of the fibers, and wherein said interface coating is different from the composite and resides on the fibers between the fibers and the composite.

27. The method of claim 26, wherein the fibers are of a form comprising either a continuous configuration or a non-continuous configuration, said fiber form also affecting the degree of ductility exhibited, and wherein the step of incorporating fibers further comprises the step of selecting a fiber form capable of producing the desired degree of ductility.

28. The method of claim 26, further comprising the step of incorporating filler material into the composite in a sufficient quantity to produce a desired degree of at least one property exhibited by the structure, wherein the degree to which said at least one property is exhibited varies with the percentage by volume of filler material.

29. The method of claim 28, wherein the type of filler material incorporated additionally affects the degree to which the at least one property is exhibited, and wherein said step of incorporating filler material further comprises the step of selecting a filler material type capable of producing the desired degree of the at least one property.

30. The method of claim 29, wherein the at least one property comprises either (i) the hardness or (ii) the coefficient of friction exhibited by the FRCMC structure.

31. The method of claim 29, wherein the at least one property comprises both the hardness and the coefficient of friction exhibited by the FRCMC structure.

* * * * *